A. B. GREEN.
APPARATUS FOR MEASURING OR DETERMINING THE VISCOSITY OF PAPER STUFF IN THE BEATING MACHINE.
APPLICATION FILED SEPT. 22, 1913.
1,125,017.
Patented Jan. 12, 1915.
2 SHEETS—SHEET 1.
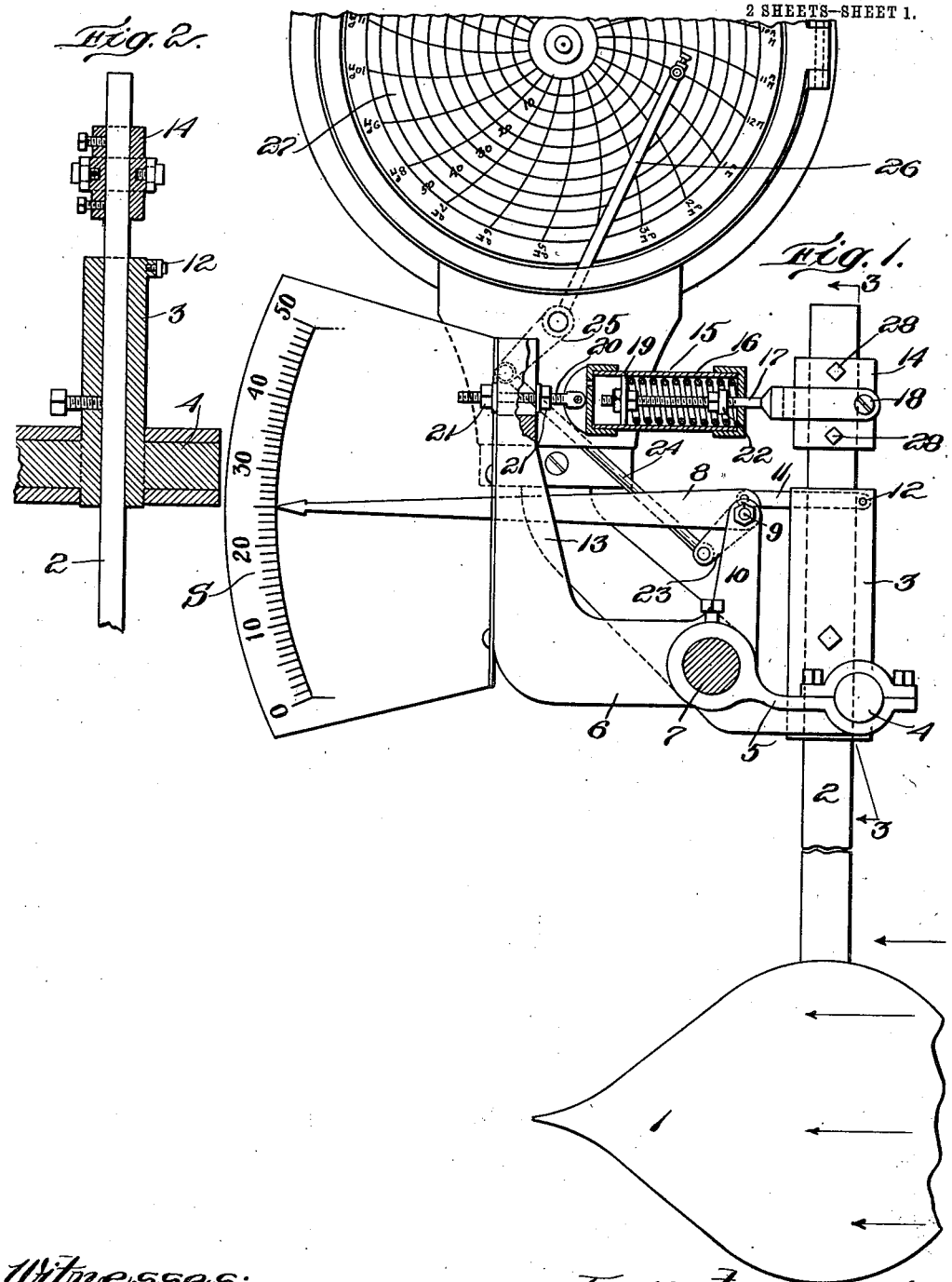

A. E. GREEN.
APPARATUS FOR MEASURING OR DETERMINING THE VISCOSITY OF PAPER STUFF IN THE BEATING MACHINE.
APPLICATION FILED SEPT. 22, 1913.
1,125,017.
Patented Jan. 12, 1915.
2 SHEETS—SHEET 2.
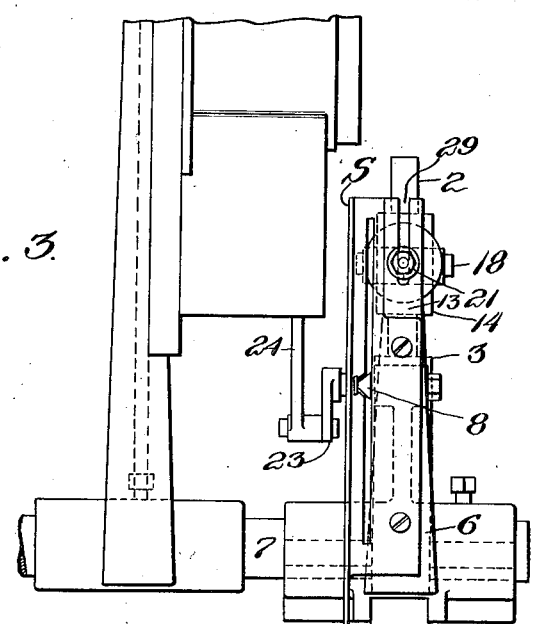
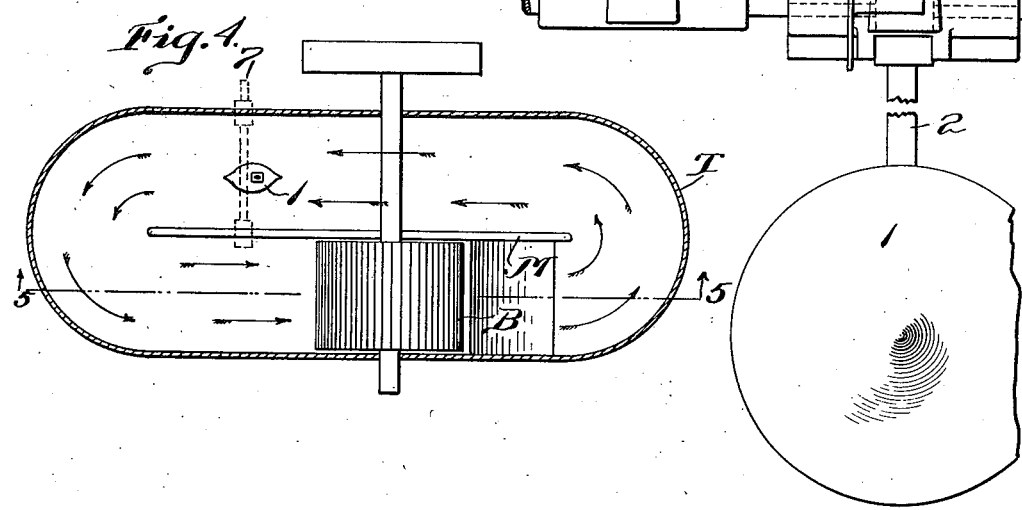
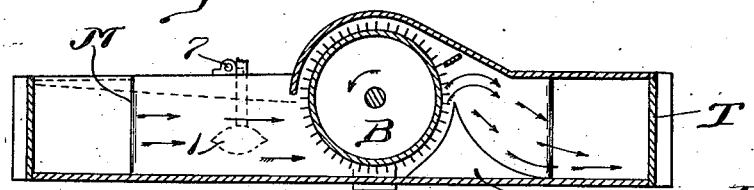

UNITED STATES PATENT OFFICE.

ARTHUR B. GREEN, OF PORTLAND, MAINE, ASSIGNOR TO S. D. WARREN & COMPANY, OF BOSTON, MASSACHUSETTS, A COPARTNERSHIP.

APPARATUS FOR MEASURING OR DETERMINING THE VISCOSITY OF PAPER-STUFF IN THE BEATING-MACHINE.

1,125,017.   Specification of Letters Patent.   Patented Jan. 12, 1915.

Application filed September 22, 1913. Serial No. 790,993.

*To all whom it may concern:*

Be it known that I, ARTHUR B. GREEN, a citizen of the United States, and resident of Portland, in the county of Cumberland and State of Maine, have invented new and useful Improvements in Apparatus for Measuring or Determining the Viscosity of Paper-Stuff in the Beating-Machine, of which the following is a specification.

The invention relates to apparatus for measuring, indicating and making a record of the variations in the physical properties of the paper "stuff" during the beating operation by which the surface friction against solid bodies and internal friction, or viscosity, may be definitely determined in relation to a given standard. By measuring and indicating the variations in these physical properties during the process of beating, the extent of treatment the stuff has undergone may be very accurately judged, and by so blending the various ingredients of the paper stuff as to bring these physical properties to definite values at the beginning of the operation of each run, the density of the stuff (that is, the required proportion of solid matter to water) may be regulated according to a predetermined standard. The improved apparatus employed for this purpose comprises an object of desired form, preferably a prolate-spheroid with projecting polar spurs, or it may be more familiarly termed approximately lemon-shaped, submerged in the stuff having a normally unobstructed flow in the tub, which is open to atmospheric pressure and this object or drag being held against lateral displacement but adapted to be moved longitudinally of the tub through the friction of the stuff as it continuously flows past under the influence of a constant propelling mechanism operating at constant speed. The resistance of this object, or drag, to the passage of the stuff, depends upon the two physical factors named, that is, surface and internal friction of the stuff, and the total resistance is measured by a suitable system of lever connections between the drag supporting rod and an indicator on a scale, and the variations in such resistance, which correspond with the variations in the density and fluidity of the stuff, are recorded by means of connection between said lever system and an automatically operated recording device. By varying the shape of the submerged drag, either of the elements of resistance may be accentuated above the other, and thus it may be made to measure to the greater degree whichever of the elements varies the most under given conditions.

It is found that the lemon-shaped drag tends to emphasize the viscosity as the chief factor in the force exerted by the stuff upon the drag.

In the drawings forming a part of this specification,—Figure 1 is a front elevation of the measuring and recording apparatus, the rod to which the drag is attached being shown broken; Fig. 2 is a sectional view of the supporting sleeve, secured to the drag rod, on line 3—3, Fig. 1; Fig. 3 is an elevation of the apparatus shown in Fig. 1, viewed from the right of that figure; Fig. 4 is a plan of the beater tub showing the position of the drag and of the shaft which supports the measuring and recording apparatus in relation to the tub; and Fig. 5 is a vertical section of the tub on line 5—5, Fig. 4.

Referring to the drawings by indicating characters, 1 is a lemon-shaped bulb or drag submerged in the stuff tub T of the beater.

2 is the supporting rod for the drag which passes up through a sleeve 3 vertically adjustable thereon, and supported in journals 4 carried by arm 5 of the supporting frame 6. This frame and the whole apparatus is supported upon a shaft 7 which has bearings upon one side of the tub T and upon a central vertical partition, or midfeather, M, in the tub, as indicated in dotted lines, Fig. 4; the frame 6 being keyed to the shaft 7. The sleeve 3 and rod 2 with other parts attached thereto may be tilted upon the journal 4 in a plane parallel with the length of the tub. An indicating finger 8 is pivoted at 9 upon an arm 10 projecting upward from the frame 6, and a link 11 is pivoted at one end to the indicating finger 8 above its pivotal point 9, and at its other end the link is pivoted at 12 to the sleeve 3, so that as the rod 2 and sleeve 3 are tilted upon the journal 4, the indicating finger 8 will be caused to swing up and down upon its pivot 9, the point of the finger swinging over the scale S, graduated in suitable units.

13 is an upwardly projecting arm of the supporting frame, and between its upper end and a holding sleeve 14, which is secured to the rod 2, is a cylindrical casing 15, containing a coiled spring 16. A piston rod 17 within the cylinder 15 extends outward and is pivoted at 18 to the sleeve 14. To the inner end of the piston rod 17 a piston 19 is attached, and the corresponding end of the cylinder 15 is pivotally connected by a screw-threaded rod 20 to the upper end of the arm 13, and may be adjusted longitudinally by means of nuts 21 upon either side of the arm 13, and vertically in a slot 29 in the upper end of that arm, Fig. 4. Sleeve 14 is also adjustable vertically on rod 2 to correspond with this vertical adjustment in slot 29. The object of these two adjustments, affecting the elevation of the casing 15 with its spring 16 above the journal 4, is to compensate for errors in the stiffness of the spring 16, so as to obtain comparable results from different instruments. A stiff spring should be placed below the normal elevation; a weak spring, above the normal elevation.

The piston 19 is adjustable on the rod 17, and on this rod near the opposite end of the cylinder 15 is an adjusting, or stop-nut 22, by which the compression of the spring 16 is limited, as also the movement of the rod 17 out of the cylinder; thus determining the upward movement of the indicating finger 8 caused by its connection through the link 11 with the upper end of the sleeve 3 when that end swings to the right, Fig. 1. By the adjustment of the nut 22 on the rod 17, and the nuts 21 on the rod 20, the several parts can be regulated so that the finger 8 will stop at the extreme limits of the scale S, which indicates the maximum movement of the drag 1 caused by the friction of the paper-stuff as it flows past the drag within the tub T.

In the drawing the rod 2 is shown in a vertical position which indicates the mean reading on the scale corresponding to such vertical position, which is due to the eccentric position of the journal 4 in relation to the rod. The center of the three pivotal points 4, 12 and 18 are in the same vertical line. Upon the pivot 9 is secured a crank-arm 23 to which is pivoted one end of a connecting rod 24, the other end of which rod is pivoted to a second crank-arm 25, and this arm 25 is rigidly attached to a recording arm 26, the pen or pencil of which is adapted to bear upon and leave its mark upon the graduated dial 27 as it is rotated by the usual clock-work provided in such apparatus.

In Figs. 4 and 5, B is the beater "roll" which by its operation of beating the material causes the paper-stuff to continuously flow around the midfeather M in the direction indicated by the arrows, due to the angle at which the partition or back fall P is placed in relation to the beater B. The drag 1 may be swung upward out of the tub T, upon the shaft 7, or otherwise raised, while the tub is being emptied and a new charge put in.

I claim:—

1. In an apparatus for determining the density and fluidity of paper-stuff during the beating operation, a beater tub open to atmospheric pressure, a beater which causes a substantially uniform propelling action producing a continuous flow of the fluid through the tub, a drag, immersed in this otherwise unobstructed normally flowing stream, and capable of limited movement parallel with and caused by the flow of the fluid, means which tend to return the drag to its normal position and an indicator connected with the drag-support to indicate the fluidity of the paper-stuff by the relative amount of movement of the drag produced by the friction thereon of the paper-stuff as it flows through the tub.

2. In an apparatus for determining the density and fluidity of paper-stuff during the beating operation and recording the variations in its viscosity, an approximately lemon-shaped body suspended in the paper-stuff, and capable only of movement in a plane parallel with the flow of the stuff, a device connected with and operated by the suspended body to indicate its movements, and a recording finger operated by the movement of said body, synchronously with said indicating device, to record the variations of movements of said body, and an automatically operated surface to receive the record.

Signed by me at Cumberland Mills, Maine, this fifteenth day of September, 1913.

ARTHUR B. GREEN.

Witnesses:
JOSEPH A. WARREN,
J. E. WYDE.